United States Patent [19]
Paddock et al.

[11] 3,930,995
[45] Jan. 6, 1976

[54] GRADE DISTRIBUTING APPARATUS

[75] Inventors: Paul F. Paddock, Riverside; Jerry W. Cramer, Upland, both of Calif.

[73] Assignee: Sunkist Growers, Inc., Sherman Oaks, Calif.

[22] Filed: Aug. 19, 1974

[21] Appl. No.: 498,531

[52] U.S. Cl. .................. 209/74; 209/90; 198/38; 209/121
[51] Int. Cl.² ........................................ B07B 13/08
[58] Field of Search ......... 209/90, 74 R, 74 M, 121; 214/11 R; 198/38

[56] References Cited
UNITED STATES PATENTS

| | | | |
|---|---|---|---|
| 532,597 | 1/1895 | Shireman | 209/74 R X |
| 1,496,376 | 6/1924 | Poore | 209/74 R X |
| 2,194,381 | 3/1940 | Cadman | 214/11 R |
| 2,308,729 | 1/1943 | Walter | 214/11 X |
| 2,901,089 | 8/1959 | Rabinow et al. | 214/11 R X |
| 3,086,636 | 4/1963 | Raynor | 198/38 X |
| 3,100,040 | 8/1963 | Kleist | 214/11 R X |
| 3,327,848 | 1/1967 | Barnhart et al. | 209/90 X |
| 3,401,796 | 9/1968 | Hagiz | 209/74 R |

*Primary Examiner*—Allen N. Knowles
*Attorney, Agent, or Firm*—Paul A. Weilein

[57] ABSTRACT

In a system for classifying objects, particularly fruits, which pass successively through an inspection station for evaluation according to respective grades and for generating evaluation signals corresponding to such grades. The inspected fruits are then delivered to a distribution apparatus by means of a sorting conveyor having a single row of traveling holders for the individual fruits. The sorting conveyor has a plurality of discharge stations corresponding to the different evaluation grades and, when a holder carrying a fruit reaches a discharge station that corresponds to the evaluation grade for that particular fruit, the generated evaluation signal for that particular fruit causes the holder to discharge the fruit.

10 Claims, 13 Drawing Figures

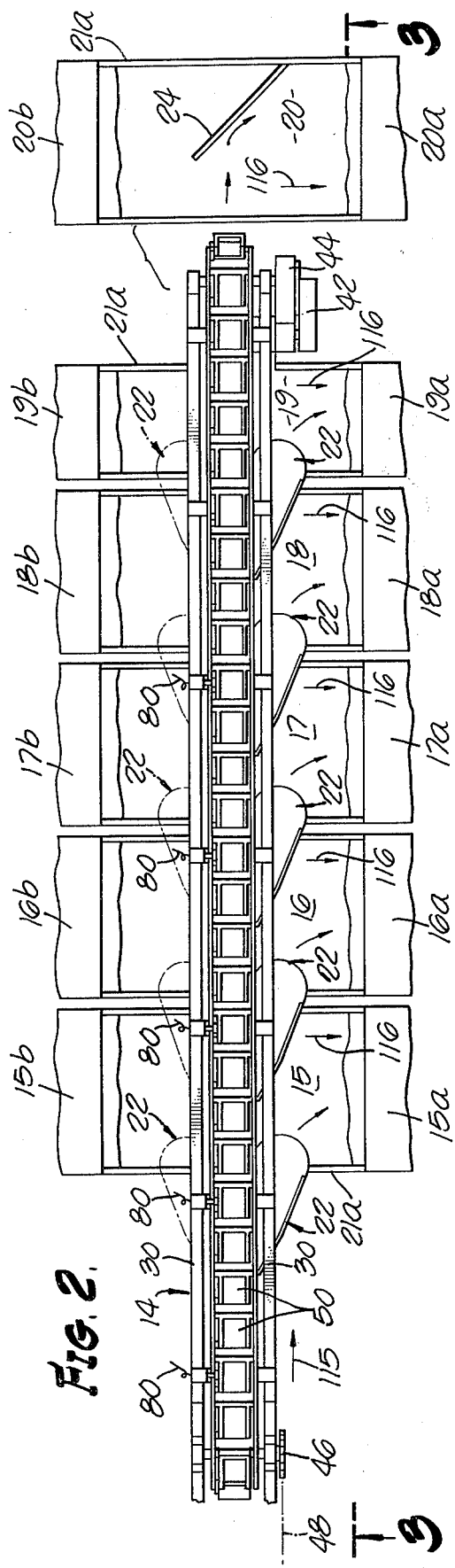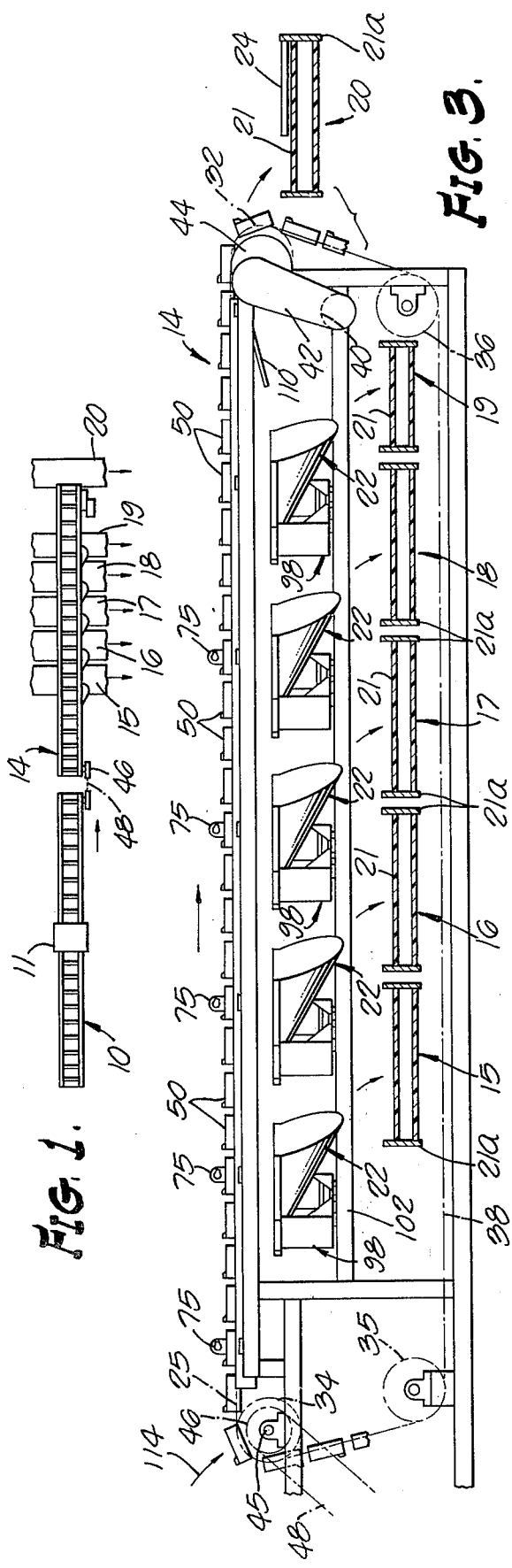

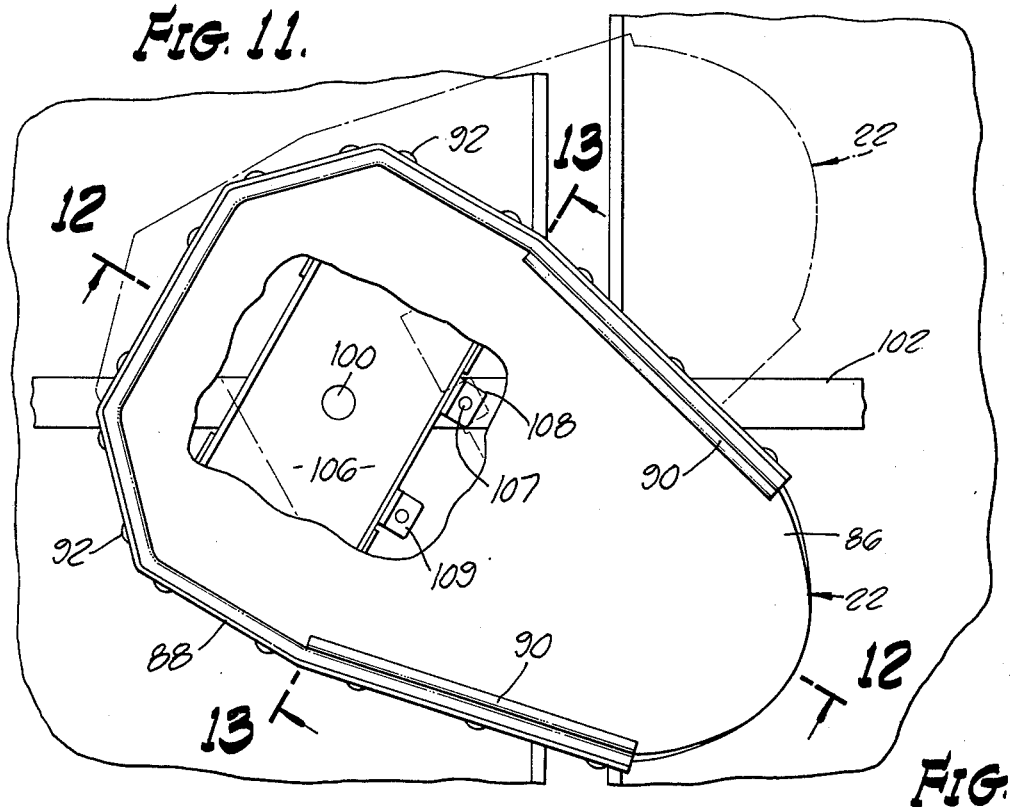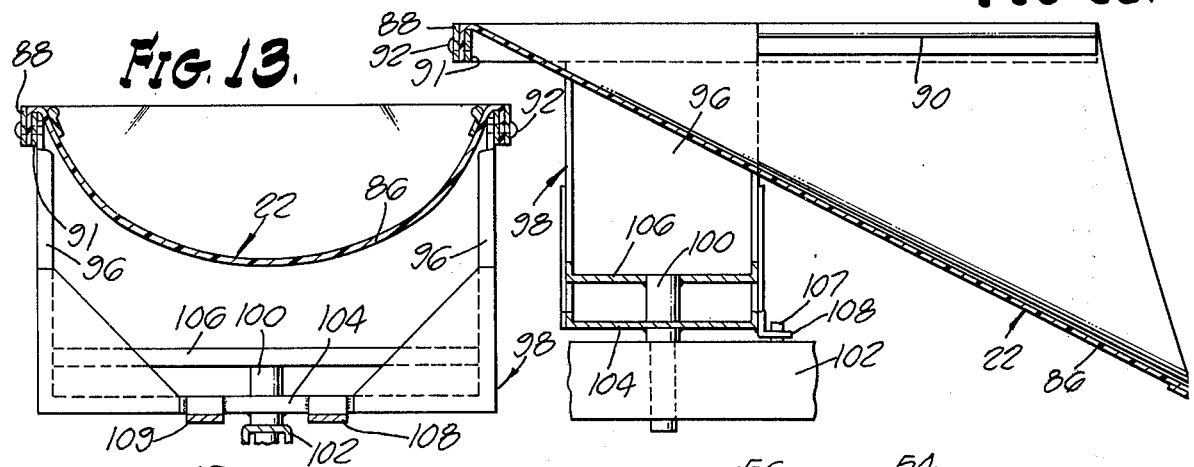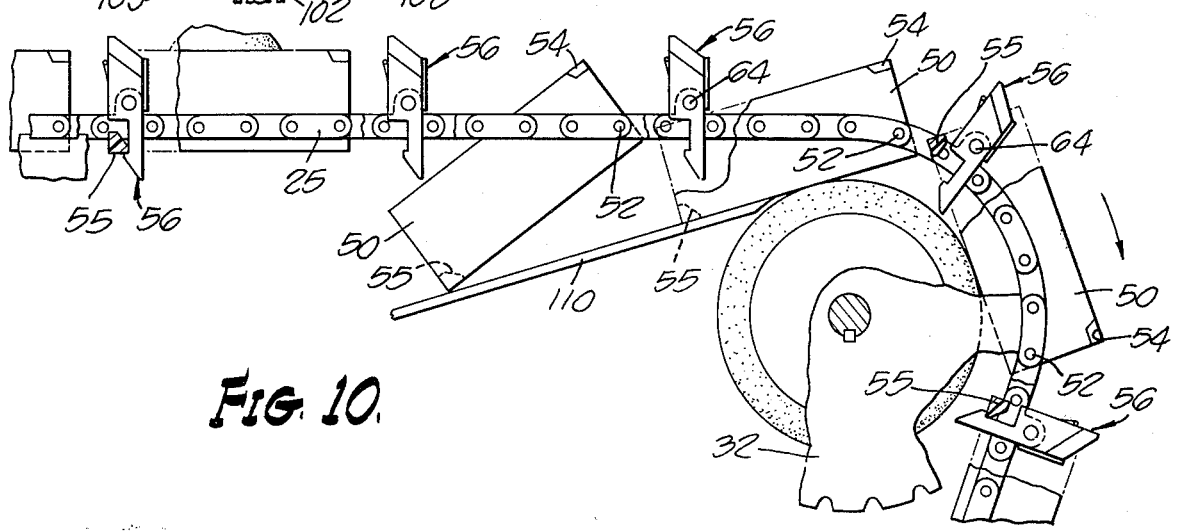

GRADE DISTRIBUTING APPARATUS

BACKGROUND OF THE INVENTION

The invention relates to a system for automatically inspecting successive objects and for dividing the objects into grades. More particularly, the invention relates to such a system of the general character that is disclosed in the Conway et al U.S. Pat. No. 3,768,645, which patent is hereby incorporated into the present disclosure by reference. In such a system fruits are conveyed in single file past an inspection station to classify the fruits into grades and to generate evaluation signals for the different grades. The fruits are then moved by traveling holders of a sorting conveyor having a series of discharge stations corresponding to different evaluated grades of the fruit. The evaluation signal for a particular fruit is stored electronically and is subsequently delivered to the corresponding discharge station as the holder for the particular fruit approaches the discharge station. The evaluation signal causes the fruit to be released at the discharge station for transfer to a corresponding transverse grade conveyor that carries the fruit to a corresponding receiving station.

The present invention is directed to the structure of such a sorting conveyor with special reference to means for releasing the fruit and diverting the fruit to the appropriate grade conveyors.

SUMMARY OF THE INVENTION

In a sorting conveyor of the type to which the invention pertains, holders for the individual inspected fruit are carried through successive discharge stations by a pair of parallel sprocket chains and one object of the invention is to provide improved holders that are operative to release the fruit at the appropriate discharge stations in response to the delayed evaluation signals. Each holder is hingedly connected to the pair of conveyor chains at a hinge axis that is offset on one side from the center of gravity of the holder and each holder is releasably connected to the pair of chains by a latch on the other side of the center of gravity. Thus, each holder carrying an individual fruit is biased by gravity to swing down from a normal latched position to a lower position to release the fruit. When a holder carrying an individual fruit approaches the discharge station that corresponds to the predetermined grade of the individual fruit, a tripper at the discharge station responds to the corresponding evaluation signal to trip the latch of the holder to release the fruit.

A further object is to provide an arrangement according to the preceding object, in which the latch and tripper have fail-safe operating characteristics. This is accomplished by utilizing a latch which is yieldably movable from a holder latching position to a holder releasing position by means of a tripper which is operable from a non-tripping position to a tripping position for intercepting and moving the latch from its latching position to its releasing position. With this arrangement, should the tripper stick or jam for any reason in its tripping position, the yieldable latch will be free to move when engaged by the tripper, thus preventing damage to the parts.

Another object of the invention is to ease the released fruit at a discharge station without damage onto a corresponding lower transverse grade conveyor. For this purpose the released fast moving fruit is received in a gentle manner by an inclined guide chute that is positioned at an acute angle to the sorting conveyor and acts to divert and direct the fruit gravitationally laterally in a downwardly inclined direction with respect to the direction of movement by the conveyor. The guide chute comprises a web of flexible sheet material of U-shaped cross section that is suspended along its opposite side edges from a suitable rigid frame with a soft elastomer bumper extending along the rigid frame to minimize impact damage to the fruit.

Another object of the invention is to solve the problem of minimizing the lost time that is involved in changing over from one run of fruit to another run. This problem arises because the transverse grade conveyors lead to corresponding receiving stations and the receiving stations must be cleared of fruit before operation can be resumed for distributing a new and different run of fruit. The same problem in a somewhat different form arises when some difficulty occurs at a receiving station which makes it imperative to divert the fruit to an alternate receiving station to avoid interruption in the operation of the distribution system.

This last object is accomplished by providing two alternate sets of receiving stations for each predetermined grade with each transverse grade conveyor reversible to deliver the graded fruit to the alternate receiving stations selectively. The angled guide chutes are correspondingly reversible.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a diagrammatic plan view on a reduced scale showing a classifying system for fruit including the sorting conveyor of the present invention;

FIG. 2 is a plan view of the sorting conveyor;

FIG. 3 is a longitudinal section taken along the line 3—3 of FIG. 2;

FIG. 10 is a fragmentary diagrammatic view showing how a stationary cam restores a released holder to its normal latched position;

FIG. 11 is an enlarged fragmentary plan view with a portion broken away showing the structure of a guide chute at a discharge station;

FIG. 12 is a longitudinal sectional view of the guide chute as seen along the line 12—12 of FIG. 11; and FIG. 13 is a transverse section of the guide chute as seen along the line 13—13 of FIG. 11.

DESCRIPTION OF THE PREFERRED EMBODIMENT OF THE INVENTION

Figure 4:
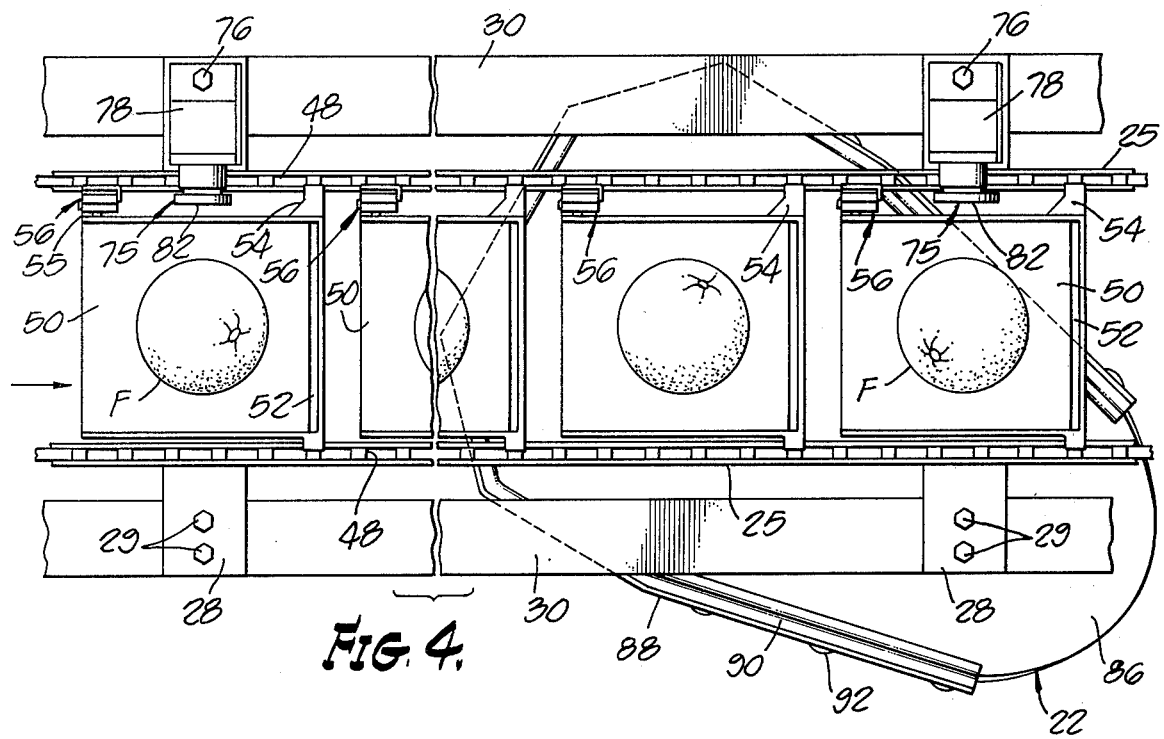
FIG. 4 is an enlarged plan view of a portion of the sorting conveyor in the region of one of the discharge stations.

FIG. 1 shows diagrammatically a complete fruit classifying system including a conveyor, generally designated 10, or other suitable means for delivering fruit from an inspection station 11 to a sorting conveyor, generally designated 14, which distributes the fruit to six transverse grade conveyors designated 15–20, respectively. The use of conveyor 10 is merely illustrative, and it will be appreciated that in some installations the conveyor 10 may be eliminated and the fruit carried directly from the inspection station by the sorting conveyor 14. Referring to FIG. 3, each transverse grade conveyor comprises a belt 21 having upper and lower runs confined by guide rolls 21a. As shown in FIGS. 2 and 3, the first five transverse grade conveyors 15–19 are positioned directly under the sorting conveyor 14 but the last grade conveyor 20 is positioned at the end of the sorting conveyor to receive the fruit that is not diverted to any of the first five grade conveyors.

Corresponding to the first five grade conveyors 15–19 are corresponding discharge stations of the sorting conveyor, each of which is represented by a corresponding guide chute 22 which receives the fast traveling fruit from the sorting conveyor and diverts and directs the fragile fruit without damage to one of the five transverse grade conveyors. Each of the guide chutes 22 is inclined at an acute angle relative to the sorting conveyor and extends laterally to one side of the sorting conveyor so as to gravitationally direct the fruit in a downwardly inclined direction with respect to the direction of movement by the conveyor. Each of the five guide chutes 22 is reversible in that it may be shifted to the opposite side of the sorting conveyor, the alternate positions of the guide chutes being indicated by broken lines in FIG. 2.

In FIGS. 1 and 2 the six transverse grade conveyors travel in the directions indicated by the arrows to deliver the fruit to corresponding receiving stations 15a–20a, but when the directions of the grade conveyors are reversed they deliver the fruit to an alternate set of receiving stations 15b–20b. The last grade conveyor 20 has a diagonally positioned baffle 24 which diverts the newly received fruit in the direction of travel of the last grade conveyor and the angular position of this baffle is reversible to divert the fruit in the opposite direction when the direction of travel of the last grade conveyor is reversed.

In this particular embodiment of the invention, the fruit is classified into six grades in accord with the degree to which the fruit is defective. The inspection station 11 comprises appropriate means to detect and evaluate the particular defects which are being checked.

In accord with the teachings of the previously mentioned Conway et al. patent, a computer integrates the findings of the inspection station 11 to evaluate the individual fruit and the computer system creates evaluation signals that correspond to the five degrees of defectiveness represented by the first five transverse grade conveyors 15–19. The five evaluation signals cause the fruit to be discharged to the first five grade conveyors 15–19, but the remaining fruit passing through all of the five discharge stations is delivered to the final grade conveyor 20.

When a fruit on the inspection conveyor 14 is evaluated in accord with the five degrees of defectiveness, the evaluation signal is stored electronically and subsequently when an individual fruit approaches the discharge station that corresponds to its evaluation signal, the evaluation signal is delivered to the discharge station to cause the particular fruit to be discharged to the appropriate one of the five transverse grade conveyors 15–19.

Figure 6:
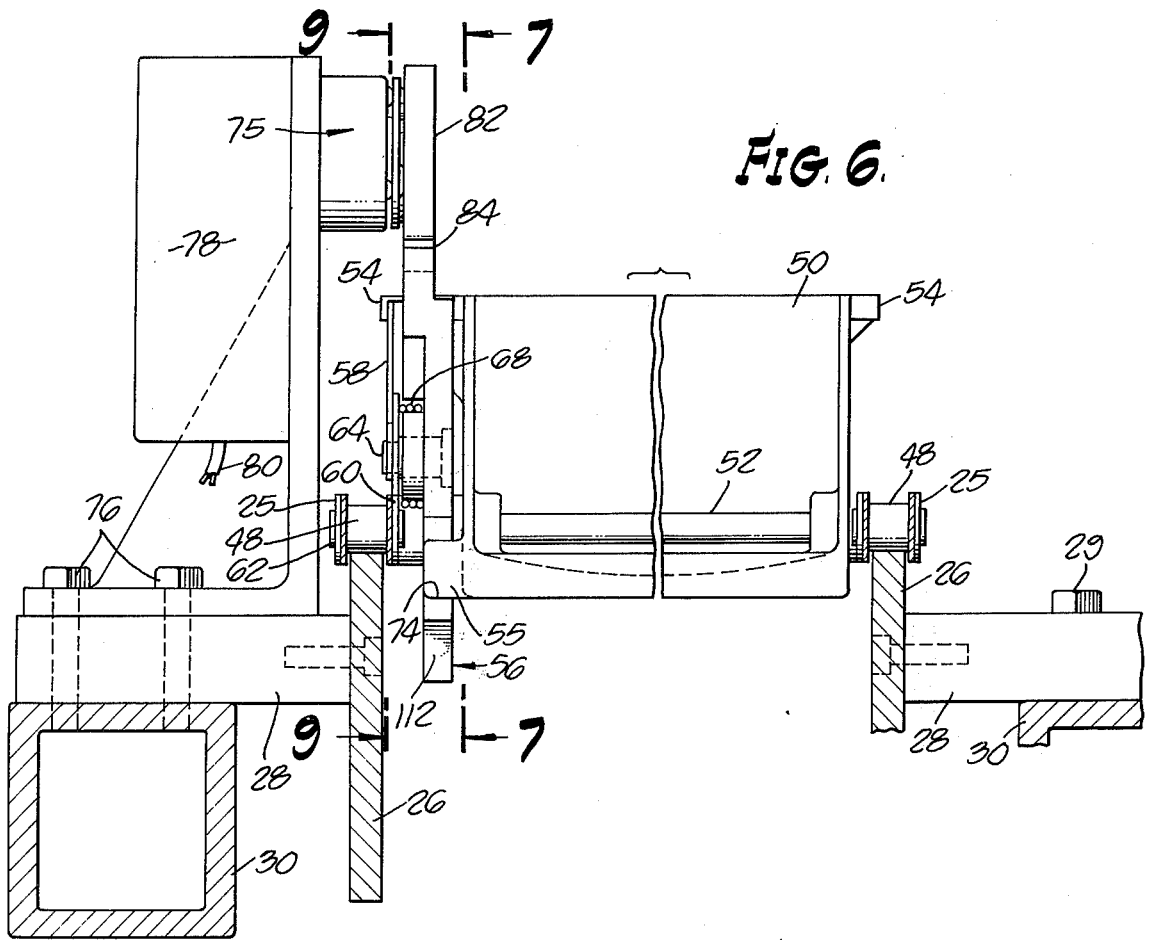
FIG. 6 is an enlarged transverse cross section along the line 6—6 of FIG. 5 showing the construction of a holder for an individual fruit and a corresponding remotely controlled tripper.

As indicated in FIG. 4, the sorting conveyor 14 has two parallel endless sprocket chains 25 and, as shown in FIG. 6, the upper runs of the two sprocket chains travel along corresponding rails 26 which are mounted by metal blocks 28 that are attached by screws 29 to corresponding longitudinal frame members 30 of the sorting conveyor. As indicated in FIG. 3, the pair of sprocket chains 25 pass over a corresponding pair of sprocket wheels 32 at the discharge end of the conveyor and pass over a corresponding pair of sprocket wheels 34 at the input end of the conveyor. Lower pairs of idler sprockets 35 and 36 at the two ends of the conveyor form the lower runs 38 of the two sprocket chains. The two sprocket wheels 32 at the discharge end of the sorting conveyor are mounted on a common shaft which is actuated by a motor 40 by means of sprockets and sprocket chains concealed by a guard 42, the shaft being driven by gearing in a gear box 44. The two sprocket wheels 34 at the input end of the sorting conveyor are keyed to a common shaft 45 that carries a third sprocket wheel 46. If conveyor 10 is being utilized, a third sprocket wheel 46 drives a sprocket chain 48 that actuates the conveyor 10 in synchronism with the sorting conveyor.

The pair of sprocket chains 25 carry an endless series of holders 50 each of which is in the form of an open top receptacle of rectangular plan configuration. Preferably, each holder is provided with a suitable resilient cushion (not shown) to decelerate fruit that is dropped into the holder and to minimize impact damage to the fruit. Each of the holders 50 is hingedly mounted on the pair of sprocket chains 25 and for this purpose each holder is rotatably mounted on a corresponding transverse cross rod 52 (FIG. 6) that is attached at its opposite ends to links of the two sprocket chains. The cross rod 52 is spaced forward from the center of gravity of the holder so that the holder is gravitationally biased to swing downward to a position indicated in broken lines at 50a in FIG. 5. At this downward position the holder releases a fruit F to a guide chute 22 at a discharge station.

Figure 5:
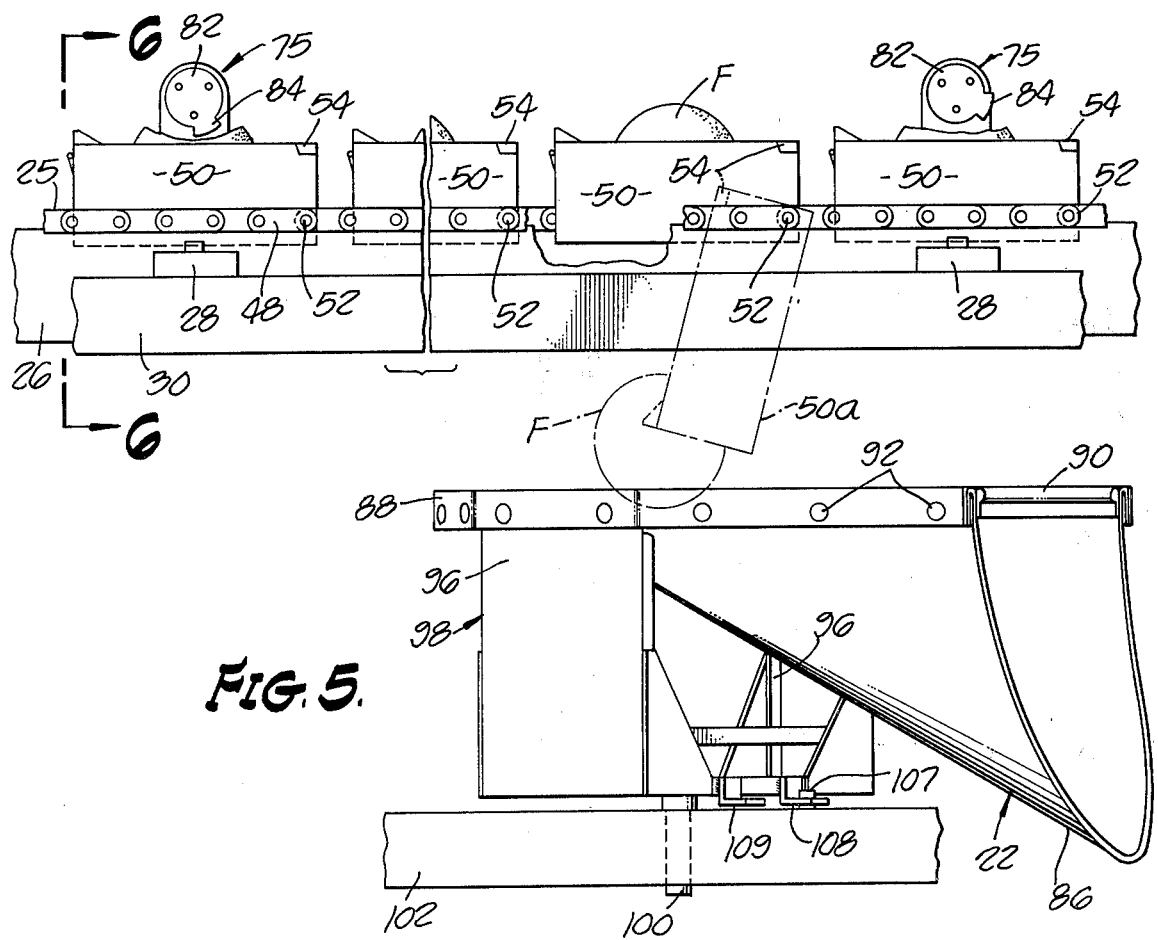
FIG. 5 is a side elevation of the same portion of the sorting conveyor.

To limit the downward swing of a holder to the position shown in FIG. 5 a forward upper corner of each holder is provided with a laterally extending stop lug 54 as best shown in FIGS. 4 and 6. When a holder 50 swings downward its stop lug 54 abuts the upper surface of one of the two sprocket chains 25.

To releasably maintain each of the holders 50 in its normal upright position, a bottom corner of each holder is formed with a laterally projecting lug 55 (FIGS. 6 and 7) for releasable engagement by a corresponding latch that is generally designated by numeral 56 in FIGS. 4 and 6–10. The construction of a latch 56 may be understood by reference to FIGS. 6–9.

Each latch 56 has an upright sheet metal base 58 that has a pair of lower opposite ears 60 by means of which it is mounted on two pins 62 of a sprocket chain 25 at opposite ends of a link of the sprocket chain. The base 58 of a latch 56 fixedly carries a laterally extending headed pivot pin 64 for a latch lever 65 and is further formed with an upper stop flange 66 to cooperate with the latch lever. A suitable coil spring 68 has a lower end 70 bearing against the base 58 and has an upper end 72 that bears against the upper arm of the latch lever 65 to bias the latch lever clockwise as viewed in FIGS. 7 and 8.

Figures 7, 8, 9:
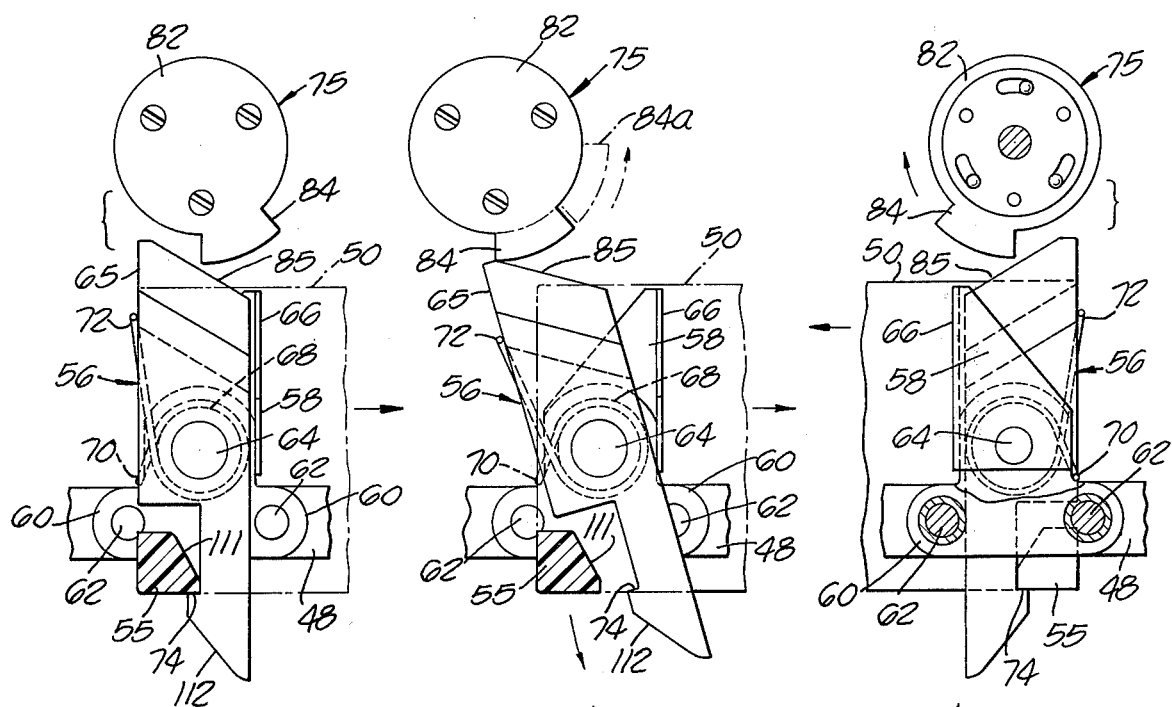
FIG. 7 is a section along the line 7—7 of FIG. 6 showing the latch of the holder in its normal position for keeping the holder in normal upright position.
FIG. 8 is a similar view showing how the latch is released by a remotely controlled tripper.
FIG. 9 is a transverse section along the line 9—9 of FIG. 6, this figure being similar to FIG. 7 but showing the latch as viewed from the opposite side.

The lower arm of the latch lever 65 is cut away to form a latch shoulder 74 for hook engagement with the holder lug 55 from below as best shown in FIGS. 7 and 9. The upper operating arm of the latch lever 65 extends upward for actuation selectively by five stationary remotely controlled trippers 75 located at the five discharge stations corresponding to the five guide chutes 22. As best shown in FIG. 6, each tripper 75 is mounted on one of the previously mentioned metal blocks 28 by a pair of screws 76 that also serve to anchor the metal block to the corresponding frame member 30.

Each of the trippers 75 comprises a rotary solenlid 78 connected to a corresponding electric cable 80 for remote control. The rotary solenoid 78 carries and rotates a corresponding disc 82 that is positioned just above the path of travel of the upper arms of the latch levers 65. This disc 82 has a trip member in the form of a radial projection 84 which is normally above the path of the upper arms of the latch levers 65 as indicated in broken lines at 84a in FIG. 8.

The upwardly protruding arm of each latch lever 65 is formed with a forwardly facing inclined edge 85 and when energization of the rotary solenoid swings the trip member 84 of a tripper downward to the solid line position shown in FIGS. 7–9, the impingement of the inclined upper edge of the latch lever against the downwardly extending trip member cams the latch lever to open position as shown in FIG. 8 to release the holder lug 55 and thus cause the holder 50 to swing downward to release the fruit in the holder.

From the foregoing description, it will be apparent that in the event that the rotary solenoid 78 should stick or be jammed with the trip member 84 in a latch tripping position, the yieldable latch will, upon engagement by the trip member, swing to a holder releasing position, thus providing a fail-safe operation.

In the present embodiment of the invention the sorting conveyor travels at such high speed that ten of the holders 50 pass any given point in one second and since time must be allowed for each holder to swing downwardly sufficiently to release a fruit therefrom, each of the trippers 75 is positioned well in advance of the discharge station that is represented by a guide chute 22. Thus, in FIG. 3 it may be seen that the first tripper 75 is spaced in advance of the first guide chute 22 by a distance that is approximately three times the length of a holder 50.

Referring to FIGS. 4, 5 and 11–13, each of the guide chutes 22 comprises a flexible sheet 86 suspended by its edge from a horizontal U-shaped frame 88. The sheet 86 may be made of suitable plastic or may be made of woven fabric impregnated with a suitable plastic. A suitable bumper strip 90 made of rubber-like material lines the upper rim of the guide chute to minimize impact damage to the fruit. In the construction shown the upper edge of the sheet material of the guide chute is folded over a U-shaped metal band 91 (FIGS. 12 and 13) that is mounted inside the U-shaped frame by rivets 92 to clamp the upper edge of the sheet.

The guide chute 22 is supported at its opposite sides by two opposite upright arms 96 of a sheet metal yoke, generally designated 98, that has a downwardly extending pivot pin 100. The pivot pin is journalled in two aligned vertical bores of a hollow frame member 102 that extends longitudinally of the sorting conveyor midway between the two sprocket chains 25. As shown in FIGS. 12 and 13, the pivot pin 100 extends through the bottom wall 104 of the sheet metal yoke to which it is welded and for rigidity the upper end of the pivot pin is welded to a transverse wall 106 of the yoke that is parallel to the bottom wall 104.

To releasably secure each guide chute 22 at its two alternate positions selectively, the horizontal hollow frame member 102 is provided with an upwardly protruding stud 107 and, as best shown in FIG. 11, the yoke 98 is provided with two laterally extending ears 108 and 109 that are apertured to engage the stud 107 selectively. In FIG. 11 the ear 108 engages the stud 107 but it is apparent that the guide chute may be swung to its opposite position for engagement of the ear 109 with the stud.

When a downwardly hanging released holder 50 travels beyond the last guide chute 22, the released holder encounters an inclined cam plate 110 as shown in FIGS. 3 and 10. The cam plate 110 swings the released holder back to its latched position.

To facilitate the relatching of a holder 50, the lug 55 of the holder is formed with an inclined cam surface 111 shown in FIGS. 7 and 8 and the lower latching arm of the latch lever 65 is formed with a cooperating cam surface 112. It is apparent that the return upward swing of a released holder 50 brings the cam surface 111 of the holder lug 55 into sliding contact with the cam surface 112 of the latch lever to rock the latch lever momentarily counterclockwise to permit the holder lug to pass the latch shoulder 74 of the latch lever.

The manner in which the described apparatus serves its purpose may be readily understood from the foregoing description. With the sorting conveyor 14 synchronized with the conveyor 10, the conveyor 10 drops the inspected fruit onto the input end of the sorting conveyor as indicated by the arrow 114 in FIG. 3. Electronic circuitry at the conveyor 10 creates an evaluation signal for each fruit that is delivered to the sorting conveyor and this signal is delayed until the holder for the particular fruit approaches a tripper 75 at a particular discharge station that corresponds to the grade evaluation of the fruit. The evaluation signal energizes the rotary solenoid 78 of the tripper to cause the trip member 84 of the tripper to swing downward into the path of the latch that maintains the given holder in its normal upright position. The downwardly extending trip member 84 releases the latch in the manner shown in FIG. 8 to permit the holder to drop the given fruit into the guide chute 22 that corresponds to the evaluation of the fruit.

The guide chute diverts the released fruit laterally in the direction of travel of the corresponding lower transverse grade conveyor. Fruit passing through all the discharge stations reach the final transverse grade conveyor 20.

In FIG. 2 the sorting conveyor is traveling in the direction indicated by the arrow 115 and the grade conveyors 15–20 are traveling in the directions indicated by the arrows 116 to carry the sorted fruit to the receiving stations 15a–20a. To change over to delivery of the graded fruit to the alternate set of receiving stations 15b–20b, it is a simple matter to reverse the conveyors 15–20, reverse the positions of the guide chutes 22 and reverse the diagonal position of the baffle 24 of the grade conveyor 20a.

The description herein of the preferred embodiment of the invention in specific detail will suggest various changes, substitutions and other departures from the disclosure within the spirit and scope of the appended claims.

What is claimed is:

1. In a sorting conveyor in a system for classifying and sorting objects by grades wherein the objects successively pass through an inspection station where evaluation signals are generated for a given set of grades of the objects and the sorting conveyor has a series of successive discharge stations corresponding to the given grades where the objects are released in response to the corresponding evaluation signals, the combination of:

a conveyor;

a continuous series of interconnected holders for the inspected objects provided by the conveyor to convey the objects to the successive discharge stations, each of said holders having a normal state to transport an object and being biased to a release state to release the object, each holder being hingedly mounted on the conveyor with the hinge axis offset on one side from the center of gravity of the conveyor so that the holder is gravitationally biased to swing downward to discharge an object therefrom;

a corresponding series of latches on the conveyor traveling with the respective holders to releasably retain the holders in their normal states, in which the corresponding latch releasably secures the holder to the conveyor on the opposite side of the center of gravity of the holder so that releasing the latch causes the holder to swing downward to release an object in the holder;

said latch being responsive to return swinging movement of the holder to latch the holder at its normal position, and in which the latch includes a downwardly extending spring-biased latch arm for hook engagement with a portion of the holder and the end of the latch arm is formed with a cam surface to cooperate with said portion of the holder so that on the return movement of the holder said portion of the holder impinges on said cam surface to retract the latch arm out of the way and then the latch arm snaps into engagement with the portion of the holder;

trippers at the respective discharge stations operable in response to corresponding evaluation signals to release the holders as the holders reach the discharge stations; and fixed means in the path of the released holder to cam the holder back to its normal position.

2. A combination as set forth in claim 1 in which said portion of the holder is formed with a cam surface to cooperate with the cam surface of said latch arm.

3. A combination as set forth in claim 1 in which said latch arm is one arm of a lever and the second arm of the lever is an operating arm movable by the conveyor along a given path past the discharge stations and each of said trippers is operable to move from a retracted position to an effective position intersecting said path.

4. A combination as set forth in claim 1 in which each of said trippers has a trip member and a corresponding solenoid responsive to evaluation signals is operable to shift the trip member from an ineffective retracted position to a latch-releasing position.

5. In a sorting conveyor in a system for classifying and sorting objects by grades wherein the objects successively pass through an inspection station where evaluation signals are generated for a given set of grades of the objects and the sorting conveyor has a series of successive discharge stations corresponding to the given grades where the objects are released in response to the corresponding evaluation signals, the combination of:

a conveyor;

a continuous series of interconnected holders for the inspected objects provided by the conveyor to convey the objects to the successive discharge stations, each of said holders having a normal state to transport an object and being biased to a release state to release the object;

a corresponding series of latches on the conveyor traveling with the respective holders to releasably retain the holders in their normal states;

trippers at the respective discharge stations operable in response to corresponding evaluation signals to release the holders as the holders reach the discharge stations;

guide chutes at the respective discharge stations to receive the released objects and to direct the released objects gravitationally laterally away from the path of the conveyor, each of said guide chutes being movable selectively to alternate opposite positions directed to the opposite sides of the conveyor; and means to releasably secure each of the guide chutes at its two alternate positions selectively.

6. In a sorting conveyor in a system for classifying and sorting objects by grades wherein the objects successively pass through an inspection station where evaluation signals are generated for a given set of grades of the objects and the sorting conveyor has a series of successive stationary discharge stations corresponding to the given grades where the objects are released in response to the corresponding evaluation signals.

the combination of:

a conveyor;

a continuous series of interconnected holders for the inspected objects provided by the conveyor to convey the objects to the successive discharge stations, each of said holders having a normal state to transport an object and being biased to a release state to release the object;

a corresponding series of latches on the conveyor traveling with the respective holders, releasably engaging said holders and holding the holders in their normal states;

tripper means at the respective discharge stations operable in response to corresponding evaluation signals to engage and release said latches from said holders to thereby release the holders to their released state as the holders reach the discharge stations;

a plurality of grade conveyors corresponding to the discharge stations respectively and extending transversely of the sorting conveyor below the discharge stations; and means at each of said discharge stations to divert the released objects to the corresponding grade conveyor.

7. A combination as set forth in claim 6 in which each of said grade conveyors is reversible and each of the corresponding diverting means is reversible accordingly to divert the released objects in reverse directions.

8. A combination as set forth in claim 7,
in which the grade conveyors are reversible in direction of travel to carry the objects in opposite directions from the sorting conveyor;
in which a first set of receiving stations corresponding to the grade conveyors receive the objects from the grade conveyors when the grade conveyors travel in one direction;
and in which a second similar set of receiving stations receive the objects from the grade conveyors when the grade conveyors travel in the opposite direction.

9. In a system for classifying and sorting objects, wherein the objects are inspected in succession and corresponding evaluation signals are generated in accord with a given set of grades and the evaluated objects are delivered to a sorting conveyor of a distribution system which sorting conveyor has a series of discharge stations corresponding to the given grades and an object is released at each discharge station in response to a corresponding evaluation signal,
the improvement comprising:
a guide chute under each discharge station to receive the discharged object,
said guide chute comprising an inclined trough of flexible sheet material suspended by its edges,
said chute being at an acute angle to the sorting conveyor to divert the released object laterally of the conveyor, and
said guide chute being reversible to divert the released object in either direction laterally of the sorting conveyor.

10. In a system for classifying and sorting objects, wherein the objects are inspected to succession and corresponding evaluation signals are generated in accord with a given set of grades and the evaluated objects are delivered to a sorting conveyor of a distribution system which sorting conveyor has a series of discharge stations corresponding to the given grades and an object is released at each discharge station in response to a corresponding evaluation signal,
the improvement comprising:
a guide chute under each discharge station to receive the discharged object,
said guide chute comprising an inclined trough of flexible sheet material suspended by its edges,
said chute being at an acute angle to the sorting conveyor to divert the released object laterally of the conveyor; and
rigid means suspending the flexible sheet material of the guide chute,
said rigid means being provided with an inner resilient yieldable means to cushion impact of the objects.

* * * * *